United States Patent [19]
Ostendarp

[11] Patent Number: 5,948,130
[45] Date of Patent: Sep. 7, 1999

[54] METHOD AND APPARATUS FOR MAKING LARGE-SCALE PRECISION STRUCTURES IN FLAT GLASS

[75] Inventor: Heinrich Ostendarp, Mainz, Germany

[73] Assignee: Schott Glas, Mainz, Germany

[21] Appl. No.: 09/048,624

[22] Filed: Mar. 26, 1998

[30] Foreign Application Priority Data

Mar. 29, 1997 [DE] Germany .......................... 197 13 311

[51] Int. Cl.$^6$ .................................. C03C 27/00
[52] U.S. Cl. .................................. 65/44; 65/33.6; 65/40; 65/60.1; 65/60.8; 65/152; 65/171; 65/254; 65/255; 65/356; 65/374.13
[58] Field of Search .................... 65/29.19, 33.2, 65/33.4, 33.5, 33.6, 40, 44, 43, 60.1, 60.8, 171, 152, 254, 255, 374.13, 356

[56] References Cited

U.S. PATENT DOCUMENTS

| | | | |
|---|---|---|---|
| 528,240 | 10/1894 | Sievert | 65/362 |
| 669,381 | 3/1901 | Buttler | 65/93 |
| 789,191 | 5/1905 | Wadsworth | 65/93 |
| 798,643 | 9/1905 | Wadsworth | 65/93 |
| 798,644 | 9/1905 | Wadsworth | 65/94 |
| 798,645 | 9/1905 | Wadsworth | 65/255 |
| 818,210 | 4/1906 | Wadsworth | 65/255 |
| 907,656 | 12/1908 | Wadsworth | 65/185 |
| 1,028,128 | 6/1912 | Neuhauser | 65/94 |
| 1,261,939 | 4/1918 | Johanson | 65/156 |
| 1,297,566 | 3/1919 | Johanson | 65/255 |
| 3,369,883 | 2/1968 | Smith | 65/112 |
| 3,607,180 | 9/1971 | Merz et al. | 65/33.6 |
| 5,009,689 | 4/1991 | Haisma et al. | 65/33.6 |
| 5,484,467 | 1/1996 | Nass et al. | 65/33.4 |

FOREIGN PATENT DOCUMENTS

| | | |
|---|---|---|
| 0 802 170 A2 | 10/1997 | European Pat. Off. . |
| 0 802 170 A3 | 11/1997 | European Pat. Off. . |
| 904 468 | 11/1945 | France . |
| 2 738 393 | 3/1997 | France . |
| 111 216 | 5/1899 | Germany . |
| 32 25 483 A1 | 5/1983 | Germany . |
| 032 54 857 | 11/1991 | Japan . |
| 3-254857 | 11/1991 | Japan . |
| 082 73 537 | 10/1996 | Japan . |
| 8-273537 | 10/1996 | Japan . |
| 09 01 2336 | 1/1997 | Japan . |
| 9-12336 | 1/1997 | Japan . |
| 2 066 159 | 7/1981 | United Kingdom . |
| 2110162 | 6/1983 | United Kingdom . |

Primary Examiner—Sean Vincent
Attorney, Agent, or Firm—Michael J. Striker

[57] ABSTRACT

Flat glass provided with precision structures is required for precision applications, especially for glasses with optical properties, for example for modern flat display screen glass. A method for forming precision structures in or on flat glass includes filling a structuring surface of a forming tool with a paste-like material and pressing the forming tool on one side of the flat glass. The forming tool is heated locally shortly prior and/or during or after contact with the glass surface with the structuring surface from the outside until the structuring surface down to a depth predetermined by the height of the structures being formed reaches a temperature at which a melting and hardening of the paste-like material forming the structures occurs during contact with the flat glass. The local heating of the structuring surface is performed by laser radiation which is passed through the flat glass to the structuring surface. Alternatively an inductive or resistance heating can be performed.

41 Claims, 7 Drawing Sheets

METHOD AND APPARATUS FOR MAKING LARGE-SCALE PRECISION STRUCTURES IN FLAT GLASS

CROSS-REFERENCES

The instant subject matter is related to the disclosure in copending U.S. patent application Ser. No. 09/048633 entitled "Process and Apparatus for Hot Forming Precision Structures in Flat Glass" based on German Patent Application 197 13 309.6-45 of Mar. 29, 1997, Heinrich Ostendarp and Marita Paasch, inventors; and also in another copending U.S. patent application Ser. No. 09/048635, entitled "Forming Tool for Structuring Flat Material, especially Plate glass" based on German Patent Application 197 13 312.6-45 of Mar. 29, 1997, Heinrich Ostendarp and Marita Paasch, inventors.

BACKGROUND OF THE INVENTION

The present invention relates to a method of making large-scale or large-surface area precision structures in or on flat glass and also to an apparatus for performing that process.

Flat glass provided with large-scale precision structures is required for precision applications, especially in the optical glass field. This type of glass includes, for example display panels of new generation flat display screen devices (Plasma Display Panels (PDP), Plasma Addressed Liquid Crystal (PALC)). Micro-channel structures for control of individual lines or columns, which extend over the entire active display screen width or height and in which a plasma is ignited by electric discharge, are provided in this flat display screen glass. The boundary of each individual channel on both sides of it is provided by a rectangular crosspiece whose width is as small as possible (i.e.<100 $\mu$m). In order to obtain a sufficient discharge volume, the height of the crosspiece is substantially larger than its width. The spacing of the crosspieces should be as small as possible. Currently typical values of between 360 $\mu$m and 640 $\mu$m are achieved in small scale production. The height of the crosspieces amounts to from about 150 $\mu$m to 250 $\mu$m at a width of from 50 $\mu$m to 100 $\mu$m. Two electrodes for plasma ignition extend through each individual channel bounded by the crosspieces in plasma addressed liquid crystal (PALC), while one electrode for plasma ignition extends through each individual channel bounded by the crosspieces in plasma display panels (PDP).

During the structuring of this flat display screen glass, which for example is a 25"-PALC screen of a size of 360 mm×650 mm, the exact lateral dimensioning, relative positioning and reproducibility of the channel and thus the stability of the forming tool are crucial because of the later positioning of the electrodes. With a method based on hot shaping by means of a conventional Chromium-Nickel-Steel tool, the thermal expansion coefficient amounts to about $12\times10^{-6}$/K. For example, for a tool length of about 360 mm, as required for a 25"-PALC display screen, this always causes a length change of about 4 $\mu$m per K temperature fluctuation. Considering that the required positioning accuracy of the electrodes in the micro-channels is in the range of $\pm10$ $\mu$m, a temperature fluctuation of $\pm2.5$ K can cause considerable problems.

The permissible temperature fluctuations are considerably reduced in the larger display screens, for example 42" display screens.

The problems are similar with other applications of flat glass with large-scale precision structures.

It is known to use hot shaping methods with suitably structured forming tools for making structures in flat glass. Existing specifications limit however the possible applications of conventional hot shaping methods, such as rolling or pressing, for making of large-scale precision structures.

Conventional hot shaping methods have the following disadvantages:

When a contact between the glass and a press or roll tool acting as the forming tool occurs only for a short time, i.e. prior to solidification the work tool is removed from the glass, because of flow of the glass structure, a strong rounding occurs after this contact.

In a long-duration contact which is used in a cold-pressing method, intolerable stresses arise because of strong temperature differences and different thermal expansions of the tool and glass.

It is more difficult to prevent adherence of the tool to the glass in both methods with increasing tool temperature.

An additional essential requirement of the method of making these glasses is the maintenance of a stable production process, in which the local distribution and form of the structures are kept extremely constant. Additional limitations of the conventional hot shaping are as follows:

Since the forming tool is heated completely in a conventional hot shaping, in order to achieve a sufficient surface temperature on the contact surface for the glass, high non-reproducible temperatures occur in the required precision range of $\pm2$ K ( with typical work tool steels and glass surface areas required by the specifications), which lead to intolerable deformation of the work tool.

A higher tool wear, which requires a replacement of the forming tool, occurs during the making of structured glass with reduced structure radii.

On account of these limitations and disadvantages in the current methods of making of structures by hot shaping methods these methods have not been used up to now for making large-scale precision structures. Instead of that structures of this type are provided currently according to the state of the art on flat glass be means of screen printing methods, in which the boundaries forming the structures, the crosspieces in the above-described flat display screens, are pressed in the flat glass layer-wise by means of a glass solder. The shaping occurs by means of suitable masks applied to the glass solder, which have openings for the structures to be formed, the crosspieces for example. The masks must thus be applied for each pressed layer. About 10 to 15 layers are necessary for the above-described crosspieces in the flat display screen glass, which are about 200 $\mu$m high and on average about 70 $\mu$m wide, based on the about 30 $\mu$m thick electrodes applied in 2 to 3 layers between the crosspieces.

These screen printing methods require a considerable process engineering expense, because hardening must occur after the application of the mask on the glass solder and the filling of the mask openings. The solder must also be adjusted or selected in regard to its physical and chemical properties to fit the glass base substrate (e.g. thermal expansion coefficient) and the respective application (e.g. resistance to plasma ignition) for contacting the glass solder on a suitable glass substrate. A certain processing time of typically from 5 to 10 minutes at 450° C. is required for hardening this type of glass solder according to the application, which results in a comparatively high processing time with 15 layers, so that the known screen printing process is limited to prototype production and is uneconomical for later series production.

SUMMARY OF THE INVENTION

It is an object of the present invention to provide a method and apparatus for making large-scale precision structures in or on flat glass, which is suitable for series production of the large-scale precision structures by application and subsequent hardening of a suitable material, namely a paste, on or in the flat glass.

According to the invention the method for making large-scale precision structures on or in flat glass comprises the steps of:

a) supplying a paste-like material forming the structures to a structuring surface of a forming tool;

b) applying the paste-like material by a single pressing of the work tool to the flat glass and hardening the applied paste-like material; and c) melting the material applied on the flat glass by a local exterior heating of the structuring surface of the forming tool until a surface depth predetermined by the height of the structures has reached the required process temperature.

The apparatus for performing the method according to the invention comprises a device for supplying a paste-like material forming the structures to a structuring surface of a forming tool, means for applying the paste-like material by a single pressing of the forming tool to the flat glass and means for hardening of the applied paste-like material; and means for melting the material to be applied to the flat glass by local heating of the structuring surface of the forming tool with the applied paste at the required process temperature by a suitable exterior heat source.

Because of the features of the invention a precise formation of large-scale structures in the flat glass by applying and hardening of a comparatively paste-like material in or on the flat glass is possible very advantageously in an economical manner.

A method with a suitable apparatus for making a large-scale precision structures in flat glass is described in European Patent Application EP 0 802 170 A3, in which a paste-like material forming the structures is supplied cold to a structuring surface of a forming tool and then the forming tool is pressed on the flat glass during hardening.

The principle according to the invention however relates to a hot shaping or forming, in contrast to the above-described EP application which describes a practical cold press process. It is understood that in the hot melted-on grid or pattern applied to the flat glass the bond with the flat glass is substantially more intimate and more stable than in the case of a simple "bake-on", i.e. hardening and sintering of the grid or pattern in the case of the EP application, in which an adhesive layer is still required. Of course in the EP application radiant heat is used but only for making the applied materials flow, not however for heating of the shaping work tool in order to cause melting of the paste applied to the flat glass.

In a preferred embodiment of the invention laser radiation is used for local heating of the structuring surface of the structure forming tool. This sort of arrangement has the advantage of a very desirable uniform heat up of the structuring surface of the tool, which alternatively is obtainable by an inductive or electrical resistance heating device.

The heating can be assisted by another suitable conventional heat source, for example a flame strip device, in order to avoid use of expensive radiation-transparent heavy duty glasses with very high powers.

In order to avoid heating the entire forming tool itself excessively by the heating of the structuring surface by means of the external heat source, the forming tool may be internally cooled in preferred embodiments of the invention.

Several possible embodiments exist for forming the structures by the forming tool. Thus according to one embodiment of the invention, the forming tool with the paste-like material applied can be continuously rolled over the glass surface to be structured.

In order to avoid constant expensive replacement of the complete forming tool because of tool wear, the structures are formed advantageously with a two-part forming tool comprising a base tool and a forming medium releasably attached to it having the structuring surface for the paste-like material. After a certain amount of wear only the forming medium is replaced which is comparatively easy and economical.

Furthermore this two-part construction provides a certain amount of freedom in selection of work materials. According to another embodiment of the invention the base tool is made from a material with comparatively smaller thermal conductivity and the forming medium is made from a material with comparatively larger thermal conductivity which provides an outstanding local heating to a predetermined surface depth.

According to another embodiment of the invention it is particular advantageous when the forming medium filled with the paste in cavities or recesses during the rolling off of the forming medium from the base tool is pressed on the glass so that the paste contacts the glass and is left there during hardening of the applied paste. Because of the reduced heat capacity of the forming medium a substantially more rapid cooling of the applied structures occurs, which advantageously provides a precise and rapid formation of these structures.

The paste-like material can be a glass solder, i.e. a material which is already a paste in its initial state. This paste is rolled on or applied with a doctor blade to the structuring surface of the tool analogous to rotogravure, and subsequently bonded and hardened with the glass during contact of the tool with the glass.

It is also conceivable to heat and melt the solid glass material, especially so-called micro-sheet thin glass, locally prior to application to the structuring surface of the forming tool in order to press this flowing glass in the cavities or recess of the structuring surface of the forming tool by rolling or applying with a doctor blade analogous to rotogravure printing methods, in order then to subsequently apply it to the flat glass which is heated as necessary, to melt it with it and to allow it to cool.

To apply the electrode structures, for example in the case of the above-mentioned flat display screens, the paste-like material can be an electrically conductive paste, which is rolled on the structuring surface of the forming tool or applied with a doctor blade and hardened after contacting the surface of the flat glass.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
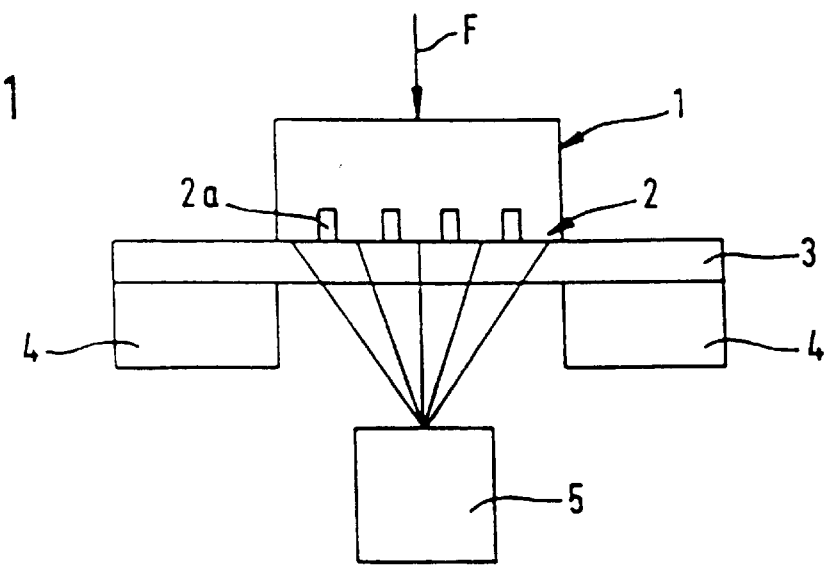
FIG. 1 is a main diagrammatic plan view of an apparatus according to the invention for heating a structuring surface of a forming tool by means of a laser which has a medium (glass) transparent for the laser radiation.

FIG. 1 shows an apparatus for a process for forming large-scale precision structures—here in the form of ducts that are separated by crosspieces—in a flat glass or glass plate 3, which in the present embodiment is a flat glass with micro-channel structures for a flat display screen. The apparatus provides a forming tool 1 with a structuring surface 2, in which a paste-like material 2a forming the structures is supplied, and, which is pressed by means of a force F on the upper side of a heated flat glass 3, in order to impress or apply the described precision structures there. The apparatus has counter-force taking members 4, in order to balance the applied force F relative to the flat glass 3.

In the glass structuring the paste-like, i.e. viscous, material 2a forming the structures can be formed by a suitable glass solder already used in known screen printing processes, however also can be flowing glass or conductive electrode materials in the case of application of electrode structures. All these materials 2a are designated in the following as "pastes" in the sense of the present invention.

Glass solder generally has a viscous consistency, which can be adjusted as needed. It is brought into the structures of the structuring surface 2 of the forming tool 1, as illustrated, by means of a process derived from printing engineering and then combined with the glass after first doctoring or rolling it into the tool structures, is combined with glass pressed on the flat glass 3 and is solidified based on the temperature of the heated flat glass, which then is about 450° C., i.e. by hardening by sintering.

Instead of a glass solder the structures applied to the glass can also be made from viscous glass, which is produced by heating over its transition temperature. An apparatus suitable for structuring glass and for application of glass is described hereinbelow.

The material to be melted, the paste 2a, is optimally, provided in a suitable thickness, which corresponds to a required supply volume per unit surface area on the flat glass 3, so that the melted material is distributed in the structures of the forming tool 1 by suitable devices described herein later continuously synchronously with the "pressing speed" of the forming tool embodied as a roller. Here "pressing speed" means the surface area covering speed of the forming tool 1.

For the precision structures in the flat display screen according to the invention the required glass thickness for formation of the crosspieces between the ducts or channels amounts to about 20 μm and 40 μm. Flat glasses, preferably ventilated glasses, so-called micro-sheets, which are produced with special manufacturing process (Down-draw), are used for this application and for comparable applications.

Alternatively micro-sheets of this type also can comprise other meltable materials besides glass.

A micro-sheet made from glass is an unstructured and extremely bendable glass because of its reduced thickness, which is marketed as a roll material. Prior to the application it must be heated in the forming tool 1 over Tg, so that it is fluid, so that it can be pressed into the structuring recesses of the surface 2 of the forming tool 1, e.g. by means of a doctor blade or an (unshown) auxiliary roller.

It is necessary that the surface of the forming tool 1 be heated to a suitable process temperature for application, tempering and contacting, i.e. melting and hardening of the paste 2a.

A complete heating of the forming tool 1 is advantageously avoided so that appication of heat energy is locally strongly limited and is very efficiently applied, since only the structuring surface 2 of the forming tool 1 is heated to the predetermined required process temperature up to a surface depth predetermined by the height of the structures.

In the present embodiment laser radiation is directed through the flat glass 3 to the structuring surface 2 of the forming tool 1 by means of a laser 5 for local heating of the structuring surface 2 to the process temperature prior to applying the tool 1 or during application of the tool 1, i.e. after applying the paste 2a, to the flat glass 3. Alternatively an inductive or electrical resistance heating can be performed.

Because of that the paste material applied to the structuring recesses or cavities in the forming surface 2 can be heated from the outside to the required process temperature.

The laser 5 is chosen so that it produces laser radiation which has as high as possible a transmission through the flat glass, i.e. no noteworthy heating of the flat glass, and the structuring surface 2 can be heated to the required process temperature for hardening of the paste. Thus the glass can be heated already to a temperature at which the glass has a certain self-stability (i.e. under the transition temperature) by means of a suitable alternative energy source during contacting with the paste 2a and the energy required for keeping the micro-sheets melting or for sintering the applied glass solder is provided by the temperature of the laser-heated forming tool.

Prior to contacting of the paste 2a with the surface of the flat glass 3, i.e. with the tool 1 lifted, the structuring surface 2 of the tool filled with the paste is pre-heated by an additional laser, so that for example the micro-sheet is heated to the suitable temperature for melting. The radiation of this additional laser need not however pass through the glass, i.e. it can be in the UV or far IR region, since the flat glass 3 is not in the path of the laser radiation with the tool 1 in this position.

High power lasers for a wavelength range in which the laser radiation is transmitted through the glass are marketed and are economical.

If necessary the heating of the structuring surface 2 of the forming tool 1 can be completed by means of the laser 5 or by an inductive or electrical resistance heating, also other suitable conventional heat sources (flame strips or the like). The ability to exactly control the extent the heated locality and amount of the local heating is an advantage of the laser in comparison to the conventional energy sources. For example, a Nd-YAG laser (wavelength 1064 nm) and a high power diode laser (wavelength about 800 nm) are suitable as laser sources, since they have a high transmission through glass. For the desired laser radiation application, as shown diagrammatically in FIG. 1, structural means for feeding the radiation to the tool 1 or its structuring surface are provided, which are known in the art. The additional heating of the forming tool 1 by a conventional heat source, as described above, is especially advantageous during the starting stage.

An additional use of a laser 5, which produces radiation which passes through glass, is that metallic electrodes or conductive pastes, which should contact with the flat glass 3, positioned on one side of the flat glass by means of the forming tool 1, are heated by means of the laser 5 on the other side of the flat glass and thus soldered or bonded with the flat glass 3.

In order to avoid excessive heating of the work tool 1 based on the heating of the structuring surface 2, it is cooled internally by known means.

The heating of the work tool 1 or its structuring surface 2 occurs at temperatures, which are below the temperature TK, at which the glass adheres to the tool. The latter temperature depends on the material properties of the structuring surface of the tool and if necessary on the antiadherency coating and also on the glass type. For example, chromium-nickel-steels, which are usable up to about 840K, because they are inclined to adhere at higher temperatures, adhere poorly to the glass. Platinum-gold alloys adhere still more poorly and are very expensive so that one must consider using a simpler material or that material only in a thin layer. In this case this material can be used anew after it wears away.

Figure 2:
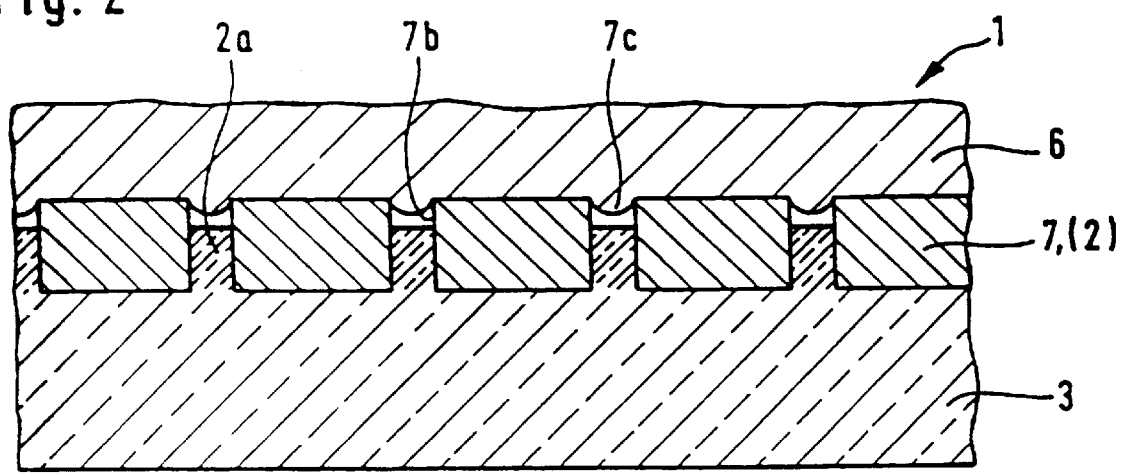
FIG. 2 is a detailed diagrammatic cross-sectional view of a two-part forming tool having a base tool and a forming medium.

The costs and reworking expenses connected with the above-mentioned tool wear (rounding of corners) can be advantageously avoided so that, as shown in the embodiment of FIG. 2, the structuring surface 2 of the forming tool 1 subjected to the wear is formed by a forming medium 7 with surface structures and openings for the paste 2a derived from the foils producing the print image in paper rotogravure. This forming medium is releasably attached to a base tool 6. This forming medium 7 can, as illustrated, be formed by different types of structures. In the main embodiment of FIG. 2 a thin structuring sheet 7 is provided, which has throughgoing openings 7b for the paste 2a conforming to the crosspieces to be formed. Suitable structures 7c for positioning of the sheet 7 are provided on the surface of the base tool 6, as shown diagrammatically in FIG. 2. These structures are to be produced substantially simpler in the case of the flat display screen application than a structured one component tool for direct forming or shaping. The thin sheet 7, which forms the structuring surface 2, can be thicker or equal to the thickness (height) of the structures produced; advantageously however thicker, thus the structures can be higher. If one produces a structure in the glass, which is higher than that desired, it can subsequently be ground to a very uniform height in a simple way.

Instead of the throughgoing opening 7b in the sheet portion 7 a recess or cavity, the so-called cup in paper printing technology, can be provided.

Because of the separation of the forming medium, of sheet 7, from the base tool 6, which can be formed by a roller or a stamp, a material with a reduced thermal expansion and higher friction, for example a special ceramic material, can be used for the base tool 6. Other factors, for example a minimal adherence to glass, higher wear resistance and higher temperature stability, as e.g. attained by the-above-mentioned chromium-nickel-steel or platinum-gold alloy, can be considered in the selection of the forming material 7.

Thus it is conceivable to use quarzal as the material for the base tool 6, which has a very reduced thermal expansion coefficient of $0.56 \times 10^{-6}$/K. Then for equal permissible length variations about a 20-fold temperature variation is permitted in comparison to that for steel as the base material.

The quarzal material has a reduced thermal conductivity. If then one uses a sufficiently thermal conductive material, e.g. a structured sheet according to FIG. 2, for the forming medium, then an outstanding local isolated heating to the predetermined surface depth is possible according to an advantageous embodiment of the two-component tool.

Since quarzal simultaneously has a poor electrical conductivity, alternatively to the use of quarzal as the material for the base tool 6 an inductive or electrical resistance heating of the forming medium 7 is possible.

An additional advantage to the separation of the base tool 6 and the forming medium 7 is that the forming medium and the paste can be left on the glass after forming of the paste 2a and contacting with the glass 3, until it hardens. A substantially more rapid temperature change takes place in comparison to that obtained leaving a completely conventional tool on the glass structure because of the reduced heat capacity of the forming medium.

Stress and strain between glass 3 and forming tool 1 are minimized during cooling, especially in a segmented forming medium provided with throughgoing openings, as is the case for sheet 7 of FIG. 2, since thermal expansion through the throughgoing openings takes place. The release of the forming medium can be provided by a conicity of the raised parts of the structuring surface 2.

The sheet 7 subject to wear can be replaced, without changing the base tool. Different rapid clamping or attaching devices which will be described hereinbelow can be used for that.

Figure 3:
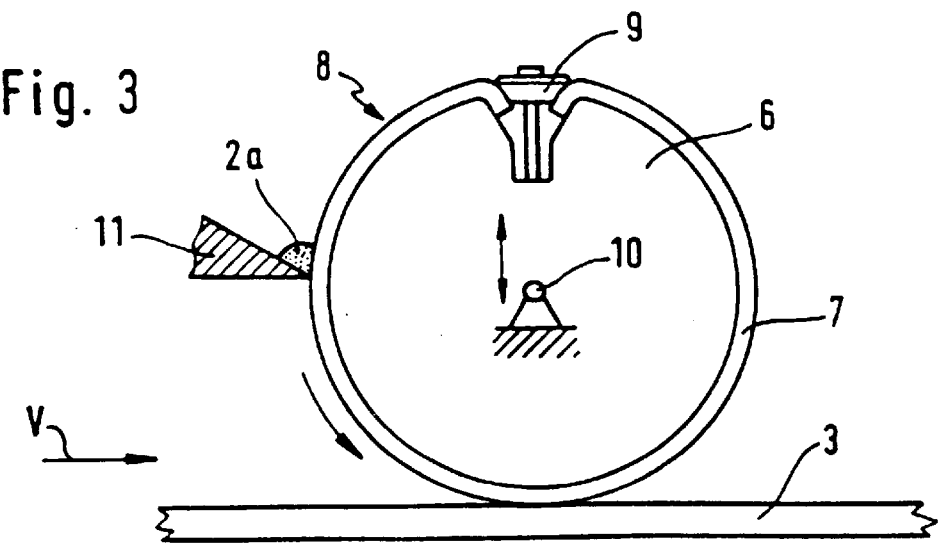
FIG. 3 is a diagrammatic cross-sectional view through a two-part forming tool according to FIG. 2 with a roller as base tool and a structuring sheet wrapped around the roller as forming medium, and with a doctor blade for application of the structuring paste to the forming medium.

Different embodiments or variations of the forming tool comprising the base tool 6 and the separate forming medium 7 are possible for application of paste 2a to the forming medium 7 of the forming tool 1 and the melting application and hardening of the paste applied to the flat glass 3. one of these is illustrated in FIG. 3 and described in the following.

FIG. 3 shows a tool 1 formed as a roller 8 comprising a base tool 6 and forming medium 7, here a structured sheet as in FIG. 2, which is attached by means of a clamping device 9 to the base tool 6. For positioning of the sheet the roller 8 has a suitable structure 7c analogous to that shown in FIG. 2. The rotation axis 10 of the roller 8 is horizontal and fixed in position. The glass 3 passes under the roller 8 with a feed speed V, which rotates in the direction of the arrow and applies the desired structures as it rolls over the surface of the flat glass 3. The roller 8 is controlled to move and press in a vertical direction.

The entire base tool 6 contacts the flat glass 3 with the forming medium 7 in the embodiment derived from rotogravure. An even contact of the forming medium 7 on the base tool 6 is guaranteed by a suitable clamping method taken from rotogravure.

Different structural devices are available so that one skilled in the art can maintain the roller axis 10 so that it is movable only in the vertical direction as shown by the arrow. The arrangement can be set forth so that the roller 8, which is pressed with the force F against the flat glass 3, rotates because of the motion of the flat glass 3 alone. A drive for the roller axis 10 can be provided.

A series of technical possibilities is conceivable in order to feed the paste 2a to be applied into the throughgoing holes of the forming medium 7, i.e. the cavities or recesses of the structured press or roller tool 8 be filled with paste 2a.

FIG. 3 shows a device with which an accumulated portion of the paste 2a, described in the following as a forward wave, located in a transition region between the doctor blade and the roller is pressed into the cavities or recesses, whereby a level surface is provided on the roller by the doctor blade 11. This type of doctor blade is used in presses. It is desired to have no paste, i.e. to provide a smooth flush surface, except in the cavities in the press roller on its surface, which contact with the class.

Figure 4:
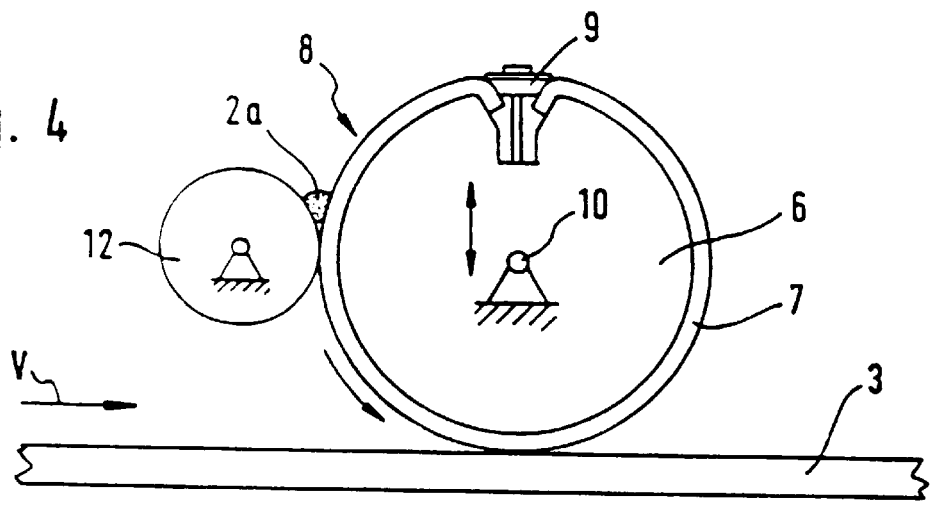
FIG. 4 is a diagrammatic cross-sectional view through a two-part forming tool according to FIG. 3, however with a second even or smooth-surfaced roller for application of the paste to the forming medium.

FIG. 4 shows an embodiment similar to that of FIG. 3, in which instead of a doctor blade 11 a plane counter-roller 12 presses the forward wave of paste 2a into the cavities provided in the forming medium 7 to make a smooth flush surface.

Figure 5:
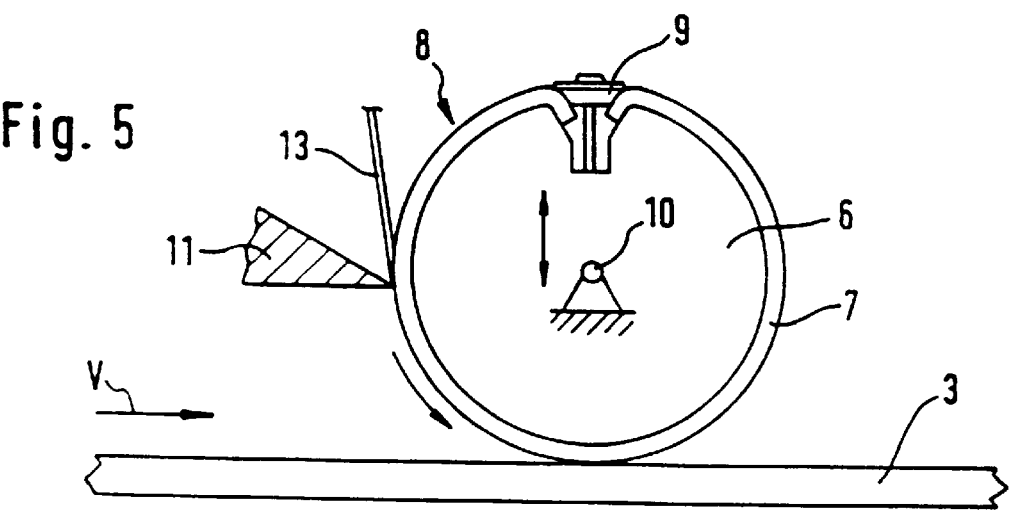
FIG. 5 is a diagrammatic cross-sectional view through a two-part forming tool according to FIG. 3, with a doctor blade for application of a melted flat glass, here in the form of a micro-sheet, as a paste in the forming medium.

FIG. 5 shows an embodiment similar to FIG. 3, in which however a melted micro-sheet thin glass 13 is pressed like a paste into the cavities of the forming medium instead of an already accumulated paste and a smooth surface is made on the roller by the doctor blade 11. This requires a preceding heating of the micro-sheets to a temperature above Tg.

Figure 6:
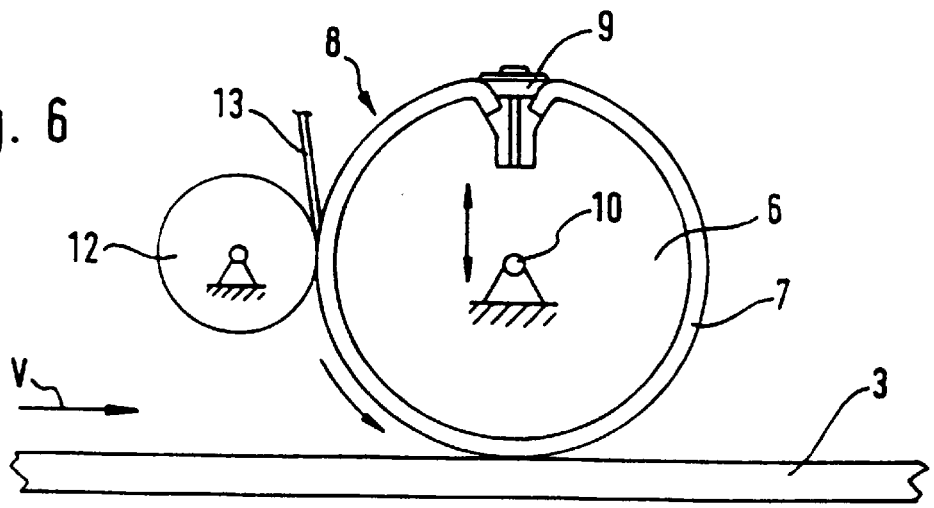
FIG. 6 is a diagrammatic cross-sectional view through a two-part forming tool according to FIG. 3, however with an even-surfaced roller for application of a melted flat glass, here in the form of a micro-sheet, as paste in the forming medium.

FIG. 6 shows an embodiment according to FIG. 4, in which however, as shown in FIG. 5, a melted micro-sheet thin glass is pressed by means of an even surfaced counter-roller 12 into the structures of the forming medium 7.

The glass in the cavities is maintained in its softened or melted state by tempering the forming medium 7 by means of the laser 5 or a comparable heating source in all these embodiments, until a contact with the surface of the flat glass 3 occurs after additional rotation of the roller 8. On contacting the structuring roller with the flat glass a contacting of the paste 2a (glass solder or melted micro-sheet) with the flat glass 3 occurs so that bonding of the paste 2a and the glass 3 can occur.

Figure 7:
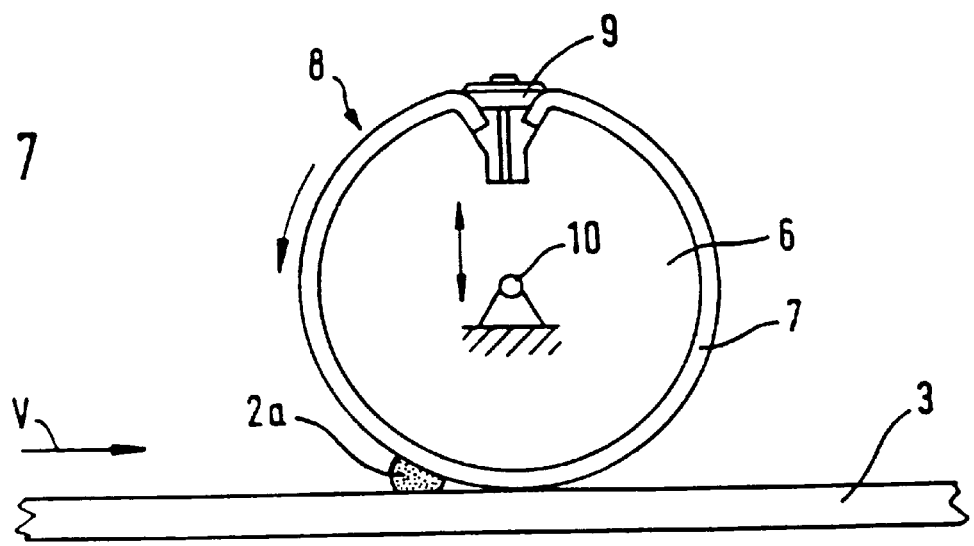
FIG. 7 is a cross-sectional view through a two-part roller forming tool according to FIG. 3, for bringing a paste in the forming medium by means of a forward wave in front of the roller tool.

An additional possiblity for filling the structuring press or roller tool 8 with a paste 2a, as shown in FIG. 7, is to position the paste on the flat glass 3 immediately in front of the structuring roller 8, which is moved as a forward wave from the structuring roller. The structures of the roller 8 are filled with the paste 2a by the compression force in the forward wave.

Figure 8:
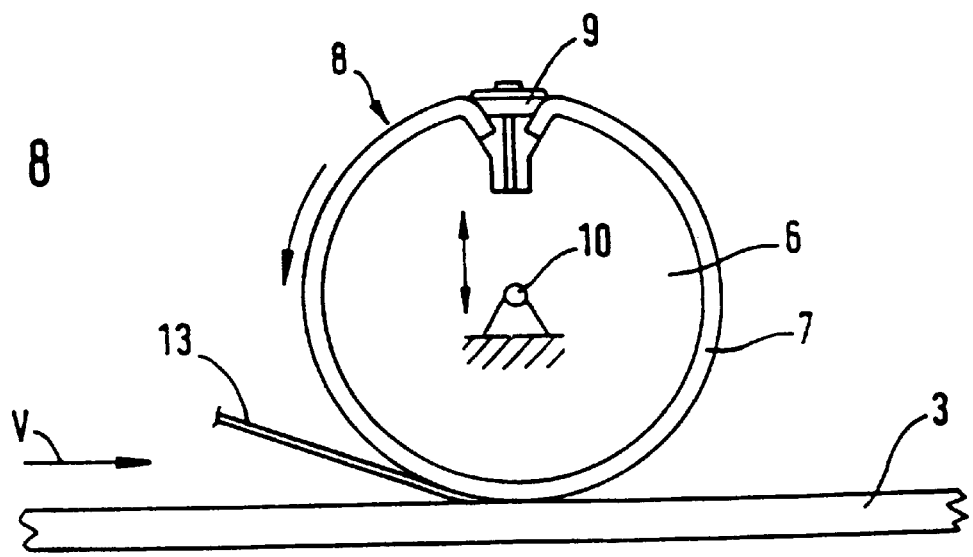
FIG. 8 is a cross-sectional view through a two-part roller forming tool according to FIG. 3 during application of melted flat glass, here in the form of a micro-sheet, to the forming medium by means of a forward wave in front of the roller tool.

FIG. 8 is a variation of the embodiment of FIG. 7, in which the cavities of the structured roller 8 are filled by a melted thin glass as paste. The enormous compression forces in the forward wave in front of the roller are to be considered as disadvantageous here.

Different possible structures for supplying the paste to the structured tool according to FIGS. 3 to 8 were shown for the two-component tool. It is understood that these methods also can be performed in the same way in a conventional one component tool with structured surface on its periphery, so that these features should not need to be described in detail and illustrated in the drawing.

The two-component structure of the forming tool however allows additional variations of the method and tool structure, which are described in the following FIGS. 9 to 13.

Figure 9:
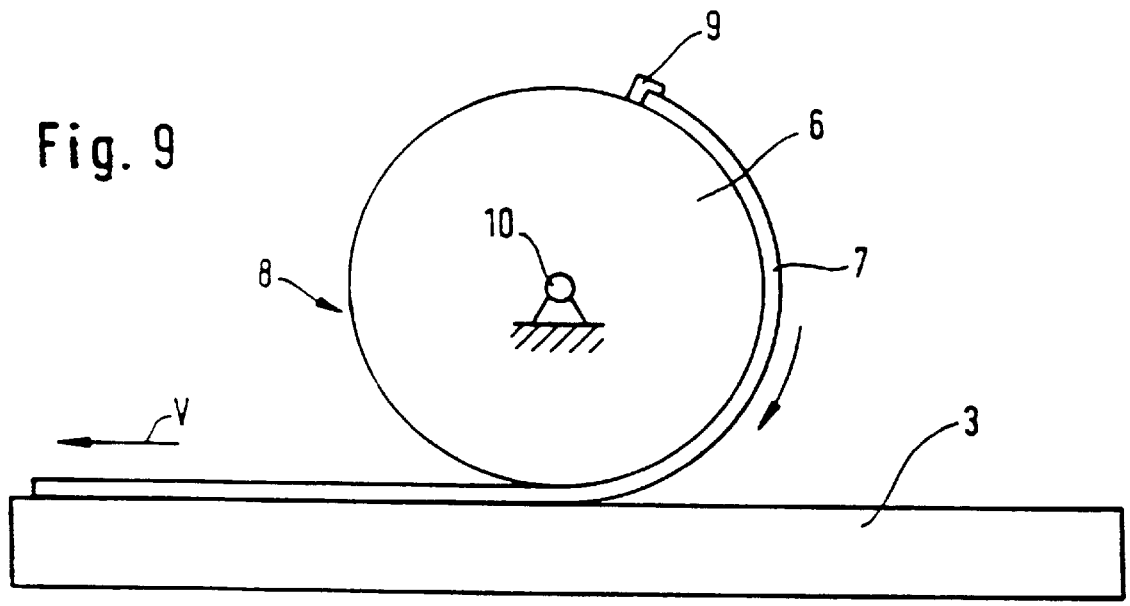
FIG. 9 is a diagrammatic cross-sectional view through a two-part forming tool according to FIG. 3, in which the forming medium in the form of a structuring sheet with paste in its structures is rolled off the base roller during the rolling of the base roller, pressed on the glass and adheres to the glass during the hardening stage.

FIG. 9 shows a two-component tool structure according to FIG. 3, in which the cavities in the forming medium 7, especially according to the embodiments shown in FIGS. 3 to 8 are filled with paste. In contrast to the embodiment of FIGS. 3 to 8 the forming medium consisting of the sheet 7 is rolled off from the base tool 6 during the rolling of the structuring roller 8. After contacting the forming medium 7 with the surface of the flat glass 3 it remains on the flat glass 3. Because of that during the hardening of the paste (sintering process or cooling of the melted micro-sheets) a mechanical stabilization of the paste occurs, so that the forming medium prevents a running of the paste. After forming the cooled medium can be removed easily from the structures because of the greater thermal contraction relative to the solidified micro-sheet glass or contraction of the glass solder. A gentle conicity of the raised structure parts of the forming medium assists this release.

Figure 10:
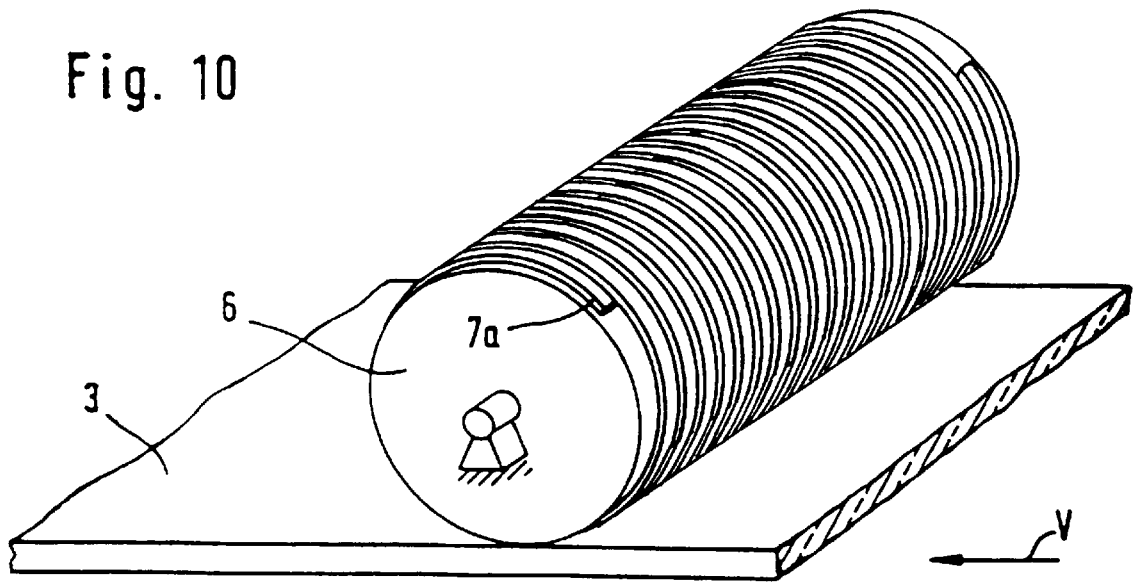
FIG. 10 is a perspective view of a two-part forming tool with a base roller having a strip of material wound around it many times in a coil-like manner as the forming medium, which is unrolled during application to the flat glass instead of a sheet.

An additional embodiment is shown in FIG. 10, in which the forming medium is a strip 7a of material wound like a coil on the roller-shaped base tool 6 and not, as in FIGS. 3 to 8 as an attached structuring sheet. The embodiment of FIG. 10 is so-to-say a variation of that of FIG. 3. Here instead of an attached sheet 7, the strip 7a of material, beginning at one end of the base roller 6, is wound about the base roller 6 along a coil-like pre-structured peripheral member, which also acts for spacing the strip of material. The paste to be applied is rubbed or brushed in the space between the individual layers of the strip according to the illustrated methods (doctoring or rolling on according to FIGS. 3 to 8), if necessary after pre-heating the micro-sheet glasses. In this embodiment there is a limitation, namely that a throughgoing gap exists between the strip windings on the base roller 6 in contrast to the embodiment according to FIG. 3. However because of that the embodiment according to FIG. 10 is dedicated to application of linear structures on the flat glass, as for example must be applied in the above-mentioned flat display screen.

Figure 11:
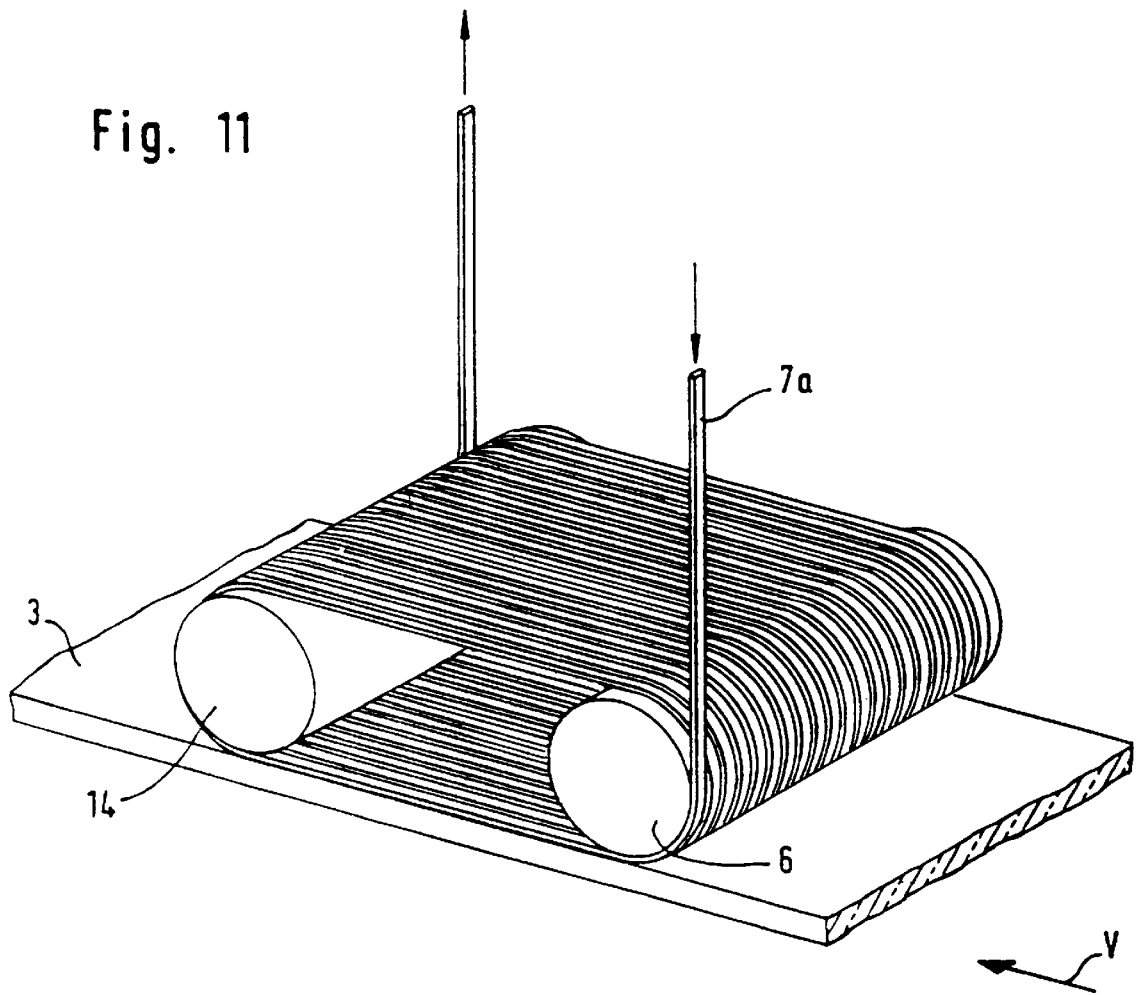
FIG. 11 is a perspective view of a forming tool comprising two axially parallel rollers, of which one is the base roller, with a strip of material as forming medium which is unwound many times.

An additional embodiment, in which the forming medium is not a suspended sheet, but is formed as a strip of as in the embodiment of FIG. 10, is shown in FIG. 11. While in the embodiment of FIG. 10 the strip of material is fixed on the roller 6 and this roller 6 with the strip 7a of material is rolled completely off over the surface of the glass 3, an embodiment shown in FIG. 11, in which similarly as in FIG. 9 the forming medium, the strip 7a of material, is left on the applied structures for a predetermined time interval. The embodiment according to FIG. 11 provides two axial parallel rollers for this purpose, a forming base roller 6 and an auxiliary roller 14. The forming base roller 6 has the strip of material to be supplied on one of its ends and is provided with closed rings for supplying the strip 7a of material perpendicular to the roller axis, which operate to space the strip of material. The base roller 6 also operates for structuring the strip 7a of material to be positioned on the flat glass in order to leave it in the applied structures during the hardening of the paste. Thus during the hardening of the paste (sintering process or cooling of the micro-sheets) a mechanical stabilization of the paste occurs, as in the embodiment of FIG. 9 (the forming medium prevents the running off of the paste), which is not desired in the conventional hot forming process. The forming strip 7a of medium is removed by means of the auxiliary roller 14 axially parallel to the base roller after hardening of the applied paste and melting with the flat glass 3 by the laser 5. This auxiliary roller is preferably not structured to be able to compensate or balance an eventual temperature and thus length variation of the base roller 6. The removal of the strip of material takes place according to the indicated arrow at the one end of the auxiliary roller. It is also possible to accomplish several strip supply and removals.

The lateral guiding of the strip 7a at the rear of the auxiliary roller 14 occurs by moving the glass 3 since the paste applied after the structuring solidifies very rapidly and the strip 7a is laterally fixed until being removed from the auxiliary roller 14.

The width of the strip 7a forming the structure amounts to about 150 to 750 $\mu$m less the crosspiece width of 50 $\mu$m to 100 $\mu$m, preferably 200 to 600 $\mu$m. It is possible to use strips with a width of less than 150 $\mu$m, however the breaking or tear strength of the strip is always less. The spacing of the strips from each other, predetermined by the guide rings on the base roller 6, should amount to about 50 to 100 $\mu$m, but preferably is as small as possible. The limiting conditions described in connection with the embodiment according to FIG. 1 regarding the adherence to the glass and the cost situation exist for the strip of material according to FIGS. 10 and 11. Since a platinum-gold alloy has a special advantage because of its non-adherence with glass, but on the other hand is however very costly, a solid strip made from this material must be remelted. In order to avoid this expense, alternatively a steel strip is used as base material, which has a suitable tensile strength and is provided with an anti-stick layer.

The heating of the strip 7a of material occurs advantageously by means of laser radiation, whereby, as already mentioned, an inductive or electrical resistance heating can also be used.

A base roller 6 made from Quarzal must be tempered with a tolerance of about ±40° C. for a display width of about 360 mm for a 25" PALC display screen, so that no additional expansion occurs which would prevent the desired accuracy of ±10 $\mu$m. For the purposes of general explanation it should be pointed out that the embodiment with the strip of material according to FIG. 11 corresponds substantially the structure of the known wafer saw. The spacing between the rollers 6 and 14 depends on the feed speed, in which the strip 7a of material remains for a few seconds to minutes in the applied paste structure until this structure hardens.

Figure 11A:
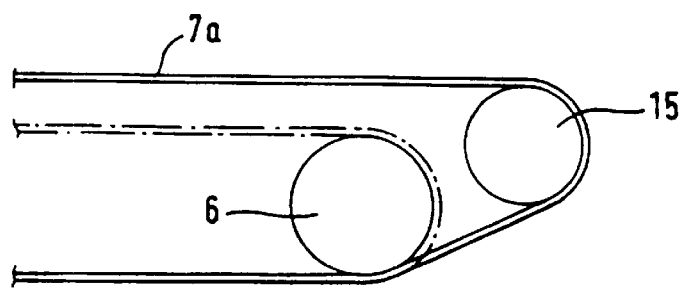
FIG. 11A is a diagrammatic side view of an additional device for the embodiment according to FIG. 11 with the strip of material around a tensioning roller for the purpose of tensioning the strip of material, during thermal stretching of the strip of material.

Because the strip 7a of material is loosened by thermal expansion by heating on the base roller 6, it is advantageous according to the embodiment of FIG. 11A, to provide a third non-structured roller 15 axially parallel to it, by which the strip of material is tightened or put under tension. The strip of material is contacted by a base roller over a small angular range. Suitable structures are available for one skilled in the art to form the arrangement according to FIGS. 11A.

Figure 12:
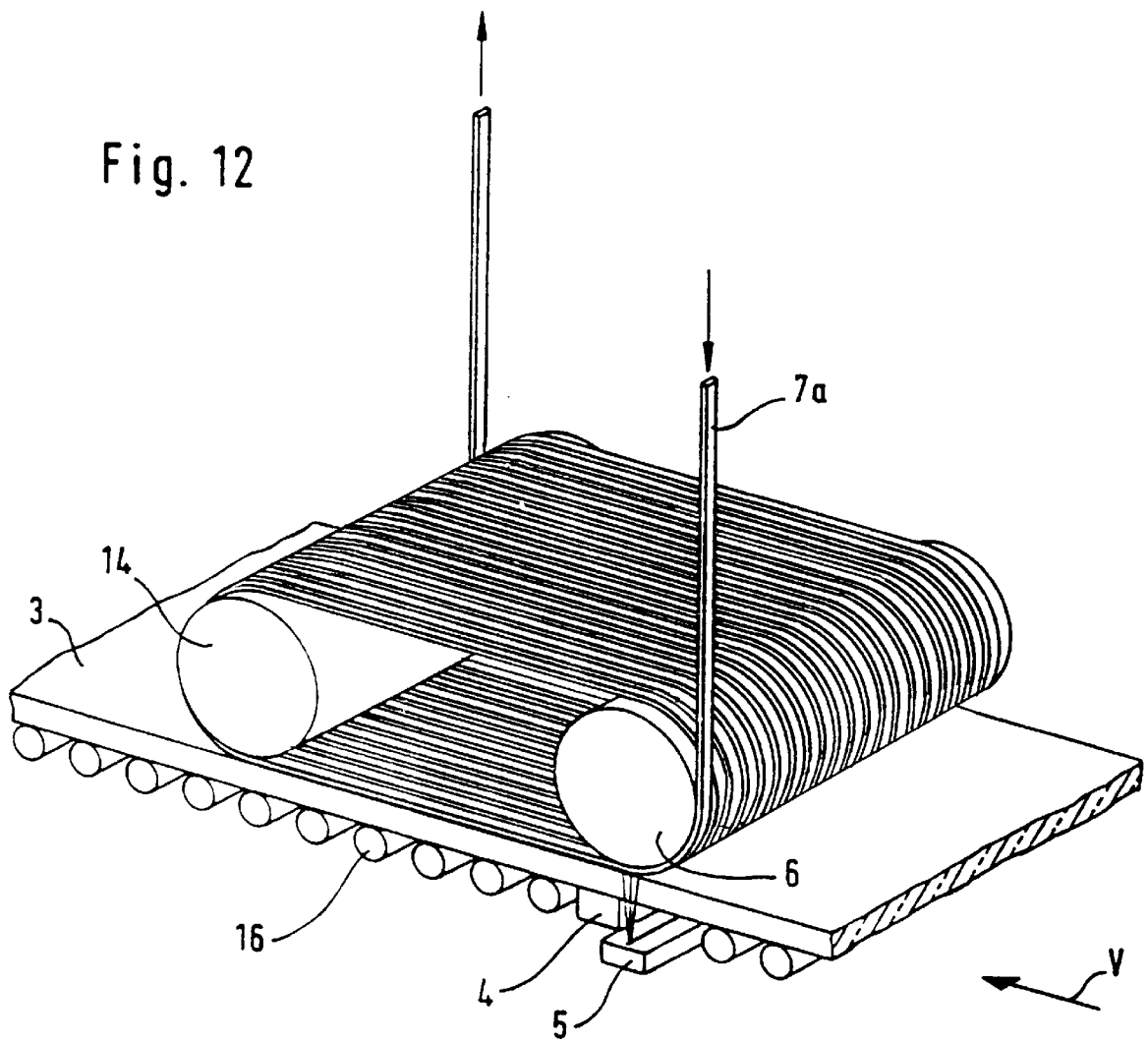
FIG. 12 is a perspective view of a device according to FIGS. 11 and/or 11A for laser radiative heating comprising a laser diode array under the flat glass.

The embodiments described up to now are combinable with a laser for heating the forming medium 7 and/or 7a and the paste 2a. FIG. 12 shows an embodiment of FIG. 11 with a suitable laser radiation heating on the contacting surface of the forming medium with the flat glass 3. An array of several diode lasers arranged side-by-side acts as a laser source 5. This laser array produces a homogeneous radiation profile on the width of the base roller 6 parallel to the roller axis. The flat glass 3 is guided over conveying rollers 16 and also at one end over a slide foot piece 4 which act to provide a counter-force to the pressing force F. The laser array is located next to the slide foot piece 4 under the flat glass 3 and directs the laser radiation to the forming medium 7a. A suitable laser with a wavelength of 800 nm is for example obtainable commercially with a power of 800 watt at 0.5 m array length. Typically about 30% of the total input power is dissipated as heat, so this produces about 240 watts of heat energy. The forming medium can be heated in a time interval of about one minute to 100K using steel in the forming medium with a thickness of 200 nm by means of a laser of 800 watt for a typical flat screen display glass of 360×650 mm. The laser power can be multiplied many times by providing several laser diode arrays.

Figure 13:
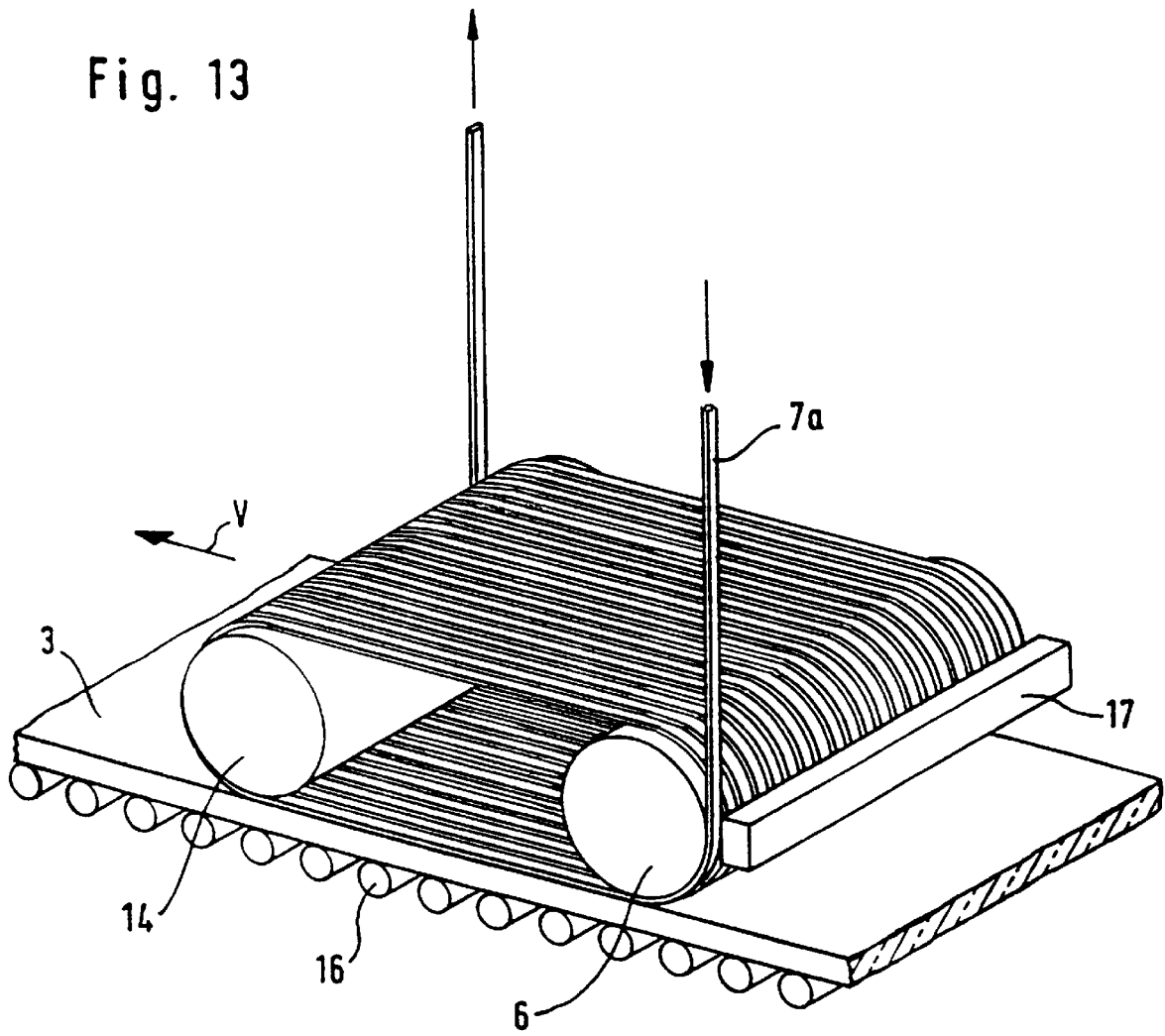
FIG. 13 is a perspective view of a device according to FIGS. 11 and/or 11A for laser radiative heating comprising a laser diode array next to and above the base roller.

The laser source 5 can also be used at other locations (in front of or behind the contacting surface with the glass) for heating the forming medium and the forming paste besides the later radiation heating of the contacting surface of the forming medium 7, 7a with the glass 3. Since during heating prior to the contacting (e.g. for heating the micro-sheets), the laser radiation must not pass through the glass 3, however also laser sources can be used whose radiation has a high absorption in the glass (such as e.g. $CO_2$ radiation). FIG. 13 shows this type of arrangement in which the laser diode array 17 is arranged laterally to the base roller.

This lateral laser diode array can also be provided in other embodiments than the above-described embodiment, especially a laser combination according to FIGS. 12 and 13 is possible.

In the following claims and for the purpose of the above application a "paste-like material" is a material which has the flow or viscosity properties of a paste.

The disclosure in German Patent Application 197 13 311.8-45 of Mar. 29, 1997 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for making large-scale precision structures in flat glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method for making large-scale precision structures on flat glass, said method comprising the steps of:
   a) supplying a paste-like material for forming the large-scale precision structures on the flat glass to a structuring surface of a forming tool;
   b) heating the structuring surface of the forming tool with the paste-like material supplied thereto locally to a surface depth according to a predetermined height of the large-scale precision structures on the flat glass at a predetermined process temperature; and
   c) applying the paste-like material by means of a single pressing of the forming tool heated in step b) on the flat glass;
   whereby said paste-like material is melted on the flat glass.

2. The method as defined in claim 1, wherein laser radiation is directed through said flat glass to the structuring surface to provide the local heating of the structuring surface.

3. The method as defined in claim 2, further comprising providing an additional heating with an additional heat source other than that providing said laser radiation.

4. The method as defined in claim 3, wherein said additional heat source is a flame strip device.

5. The method as defined in claim 1, wherein the local heating of the structuring surface occurs by an inductive heating.

6. The method as defined in claim 1, wherein the local heating of the structuring surface occurs by an electrical resistance heating.

7. The method as defined in claim 1, further comprising providing an internal cooling of the forming tool to minimize interior heating of the forming tool.

8. The method as defined in claim 1, wherein said forming tool with the paste-like material is rolled continuously on a glass surface of the flat glass to be structured.

9. The method as defined in claim 8, wherein said forming tool comprises a roller and a forming medium releasably attached to the roller, said forming medium having the structuring surface for the paste-like material to be applied.

10. The method as defined in claim 9, wherein the forming medium with the paste-like material is rolled off the roller onto the flat glass during the rolling of the forming tool over the glass surface.

11. The method as defined in claim 1, wherein the paste-like material is glass solder, melted glass and/or an electrically conductive paste for electrode structures.

12. The method as defined in claim 11, wherein said melted glass is made by melting a glass micro-sheet.

13. The method as defined in claim 1, wherein the paste-like material is brushed into cavities provided in the structuring surface prior to the applying of the paste-like material to the flat glass.

14. The method as defined in claim 1, wherein the paste-like material is rolled into cavities provided in the structuring surface prior to the applying of the paste-like material to the flat glass.

15. An apparatus for performing a method of making large-scale precision structures on flat glass, said apparatus comprising
   a forming tool provided with a structuring surface for receiving a paste-like material for making the large-scale precision structures;
   means for supplying the paste-like material used for forming the large-scale precision structures on the flat glass to the structuring surface of the forming tool;
   means for heating the structuring surface of the forming tool with the paste-like material locally to a surface depth according to a predetermined height of the large-scale precision structures at a predetermined process temperature; and
   means for applying the paste-like material to the flat glass by a simple pressing of the forming tool heated by the means for heating on the flat glass, thereby melting said paste-like material on said flat glass.

16. The apparatus as defined in claim 15, wherein the means for heating the structuring surface is a radiation source.

17. The apparatus as defined in claim 16, wherein the radiation source is a laser.

18. The apparatus as defined in claim 17, wherein said laser comprises a laser diode array.

19. The apparatus as defined in claim 17, wherein said laser is arranged on a side of the flat glass opposite to the forming tool and emits laser radiation having wavelengths such that said laser radiation is transmitted through said flat glass.

20. The apparatus as defined in claim 15, wherein said means for heating comprises an inductive heating device.

21. The apparatus as defined in claim 15, wherein said means for heating comprises an electrical resistance heating device.

22. The apparatus as defined in claim 15, wherein the forming tool comprises a base tool and a separate forming medium arranged on the base tool, and said forming medium includes the structuring surface.

23. The apparatus as defined in claim 22, wherein said base tool comprises a material having a comparatively smaller thermal conductivity and said forming medium comprises another material with a comparatively larger thermal conductivity.

24. The apparatus as defined in claim 23, wherein said material for said base tool comprises a ceramic material.

25. The apparatus as defined in claim 24, wherein said material for said base tool has a comparatively smaller thermal expansion coefficient, while said another material has a comparatively larger thermal expansion coefficient.

26. The apparatus as defined in claim 23, wherein the forming medium includes a structuring sheet piece.

27. The apparatus as defined in claim 26, wherein said structuring sheet piece is releasably attached to the base tool.

28. The apparatus as defined in claim 27, wherein the base tool is a roller, the structuring sheet piece is wound around the base tool and during the applying the structuring sheet piece is wound off the base tool and onto the flat glass.

29. The apparatus as defined in claim 27, wherein the base tool is a roller.

30. The apparatus as defined in claim 22, further comprising a structure for securing the forming medium to the base tool.

31. The apparatus as defined in claim 30, wherein the base tool comprises a roller and the forming medium comprises a strip of material wound around said roller.

32. The apparatus as defined in claim 31, wherein the base tool has a guiding structure for said strip of material.

33. The apparatus as defined in claim 32, wherein the forming tool is provided with an auxiliary roller spaced from said roller acting as said base tool and axially parallel to said roller acting as said base tool, and wherein said strip of said material is wound around both of said rollers and through the guiding structure for continuous supply and delivery of said strip of said material.

34. The apparatus as defined in claim 33, wherein the base tool comprises means for supply of said strip of said material and the auxiliary roller comprises means for delivery of said strip of said material.

35. The apparatus as defined in claim 33, further comprising a non-structured roller for tensioning said strip of material guided over said base tool and said auxiliary roller.

36. The apparatus as defined in claim 15, wherein cavities or recesses are provided in the structuring surface of the forming tool, and further comprising a doctor blade for spreading the paste-like material in the cavities or recesses provided in the structuring surface of the forming tool.

37. The apparatus as defined in claim 15, wherein cavities or recesses are provided in the structuring surface of the forming tool, and further comprising a plane surface roller for rolling the paste-like material in the cavities or recesses of the structuring surface of the forming tool.

38. The apparatus as defined in claim 33, wherein said means for heating the structuring surface comprises a laser diode array or a laser strip device and is arranged above the flat glass and beside said base tool.

39. The apparatus as defined in claim 36, wherein said means for heating the structuring surface comprises a laser diode array or a laser strip device and is arranged above the flat glass and beside said base tool.

40. The apparatus as defined in claim 37, wherein said means for heating the structuring surface comprises a laser diode array or a laser strip device and is arranged above the flat glass and beside said base tool.

41. The apparatus as define in claim 15, wherein the structuring surface has raised structuring elements and the structuring surface of the forming tool has a predetermined conicity for improving release from hardened elements on the structuring surface.

* * * * *